Figure 1:
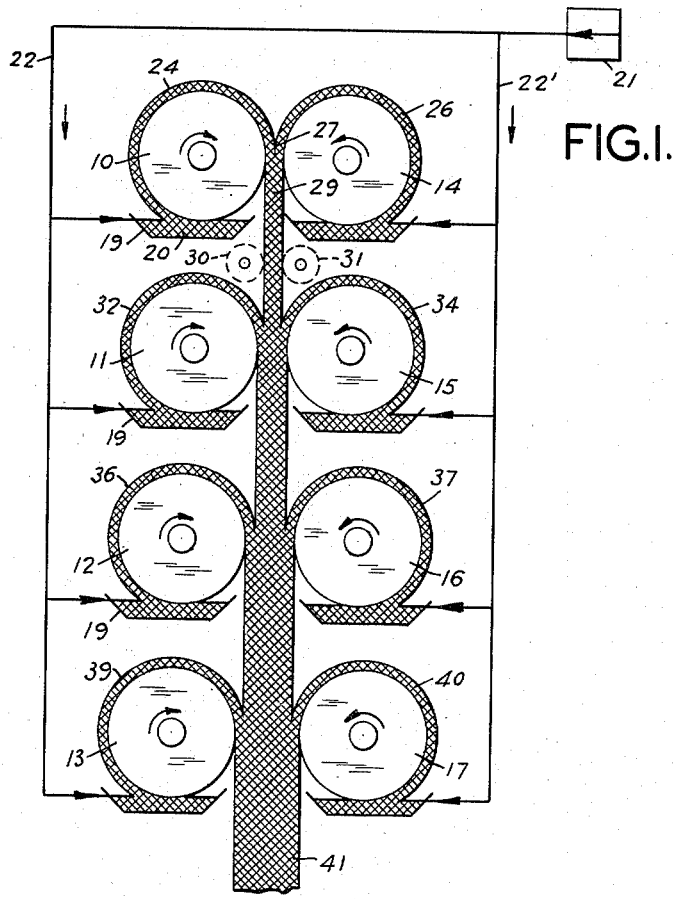

Dec. 5, 1950  R. G. ATKINSON  2,532,280
CONTINUOUS WAX MOLDING PROCESS
Filed June 18, 1947

INVENTOR.
RALPH G. ATKINSON
BY Campbell, Brumbaugh & Free
ATTORNEYS.

UNITED STATES PATENT OFFICE 2,532,280

CONTINUOUS WAX MOLDING PROCESS

Ralph G. Atkinson, Maple Heights, Ohio, assignor to The Standard Oil Company, Cleveland, Ohio, a corporation of Ohio Application June 18, 1947, Serial No. 755,512

5 Claims. (Cl. 18—55)

The present invention relates to a method of continuously molding wax.

Conventional methods of molding wax involve the filling of a trough-like mold of the desired size with wax in the liquid state and subsequently cooling wax by circulating cooling water through and around walls of the mold. In this type of process, the wax adjacent the cooled walls of the mold solidifies very quickly and the layer of solid wax adjacent the cooled walls gradually increases in thickness as more heat is removed. Eventually, all of the wax in the mold becomes solidified so that it can be removed from the mold and packaged for shipment.

These conventional methods are very inefficient because the poor heat conductivity of waxes makes it very difficult to cool the interior of the wax mass in the trough-like molds. This has the effect of extending the molding time very considerably and permits wide differences in temperature to exist between the cooled outer layer of wax and the liquid interior. The magnitude of the temperature gradient in turn causes the wax in the mold to warp during the cooling process and the formation of holes in the molded product.

Furthermore, the inherent slowness of the process, the necessarily low rate of production, the space the equipment occupies in the plant, and the cost of the labor involved in filling the molds with molten wax, removing the slabs of molded wax from the molds and in the subsequent cutting, inspection and packaging operations, all combine to make the labor and plant overhead so high as to usually be out of proportion with the initial cost and selling price of the wax.

Inasmuch as the plastic range, i. e., the difference between the solidification and liquefaction temperatures of most waxes covers a very short range, in many cases not more than about 5° F., and since it is impracticable, if not impossible, to control the temperature of a wax within such narrow limits, waxes do not lend themselves readily to extrusion processes such as are employed in the shaping of ice cream, margarine and other plastic materials which have a relatively wide plastic range.

In accordance with the present invention, a layer of wax, heated to a temperature slightly higher than its melting point, is applied to a continuously rotating cylindrical cooling surface which is maintained at a temperature below the setting point of the wax. A similar layer is applied to another continuously moving surface that is preferably also maintained at a temperature below the setting point of the wax. The speed at which these surfaces move, the thickness of the layers applied and the temperature at which the surfaces are maintained are so correlated that each individual layer of wax will be in a semi-solid to solid state, i. e., one face is solid and the other face is semi-liquid, when they are subsequently joined together.

The two surfaces may be peripheral surfaces of two opposite rollers spaced apart a distance that is approximately equal to twice the thickness of each individual layer or one surface may be a conveyor belt or the like moving over a cylindrical or non-cylindrical surface while the other surface is the peripheral surface of a roller. Another modification includes a series of cooling rollers arranged in tandem with relation to a moving conveyor belt wherein the first roller applies a layer of wax in a semi-solid state to the conveyor belt, the second roller applies a similar layer of wax onto the first layer, the third roller applies a similar layer of wax onto the second layer, and so on until a continuous, unitary sheet of wax of the desired thickness is formed that is in a solid to semi-solid state throughout its thickness.

The cooling surfaces on which the individual layers of wax are deposited may be cooled by any suitable cooling medium, such as circulating water, refrigerating coils, and the like, beneath or in contact with said surfaces.

The individual layers of wax may be applied to the cooling surfaces by moving them through pans of molten wax, by spraying or pouring molten wax onto the cooling surfaces, or by any similar means.

The width of the wax sheets produced in accordance with this invention may be controlled simply by controlling the width of the individual layers formed on the cooling surfaces and their thickness is determined by the number and thicknesses of said individual layers that are made to coalesce in the course of the operation.

The sheets of wax produced in accordance with this invention may subsequently be cut into desired sizes by any suitable cutting means such as wires, saws, and the like that may be operated automatically and then be conveyed to an automatic wrapping machine.

While the invention is not limited to any particular theory, it is believed that the cooling surfaces upon which the individual layers of molten wax are deposited effect a momentary supercooling of the wax in the layers that leaves them sufficiently liquid to adhere to one another and then causes them to crystallize and harden to form a single, unitary sheet. When a thin layer of wax is brought into contact with the face of a layer that had just previously been in contact with a cooling surface, it is believed that the slightly higher temperature at the face of the thin layer that is brought into contact with the cooled face is sufficient to momentarily modify the crystalline structure of the latter and to effect a bond therewith by subsequently crystallizing and hardening.

The method of this invention is particularly adapted to the molding of waxes from petroleum sources such as paraffin wax, because this type of wax has a short plastic range and low coefficient of thermal conductivity which renders it difficult to mold by other processes. However, other waxes may be molded by means of the process described herein.

One important advantage of the present invention is that it provides a method of cooling and solidifying wax in a much more efficient manner and to any desired thickness than was hitherto considered possible. This advantage is inherent in the method of this invention because the thickness of wax through which heat must be transferred to bring it into semi-solid state is at all times very small.

Another advantage of the present invention is that it is practically automatic and therefore requires a minimum of labor.

Still another advantage of the invention is that it is capable of continuously producing wax sheets or cakes of any desired thickness and width.

Still another advantage of the present invention is that it is capable of producing uniformly solid wax sheets or cakes not having air-holes or other perforations as are found in the center and tops of cakes molded in the conventional molds.

Another important advantage of the invention is that the final layer of wax, molded into the form of a continuous, unitary sheet may be conveyed to continuous and automatic cutting and packaging equipment such as is now used in the continuous and automatic cutting and packaging of cake soap and other extruded products.

A further advantage of the present invention is that the apparatus is extremely flexible in that it is easily adapted to waxes of different melting points, different cooling media, different production rates and to different thicknesses and widths of the cakes to be produced. Thus, for example, if the apparatus is to be adjusted for a higher melting point wax than that previously molded, the rate of rotation of the rollers and, if necessary of the conveyor, need simply be increased or the temperature of the cooling medium may be increased. If cooling water is used to cool the rollers and it is found that the temperature of the water is increased, it is necessary only to decrease the rate of rotation of the drums and the rate of flow of wax to the rollers.

Figure 2:
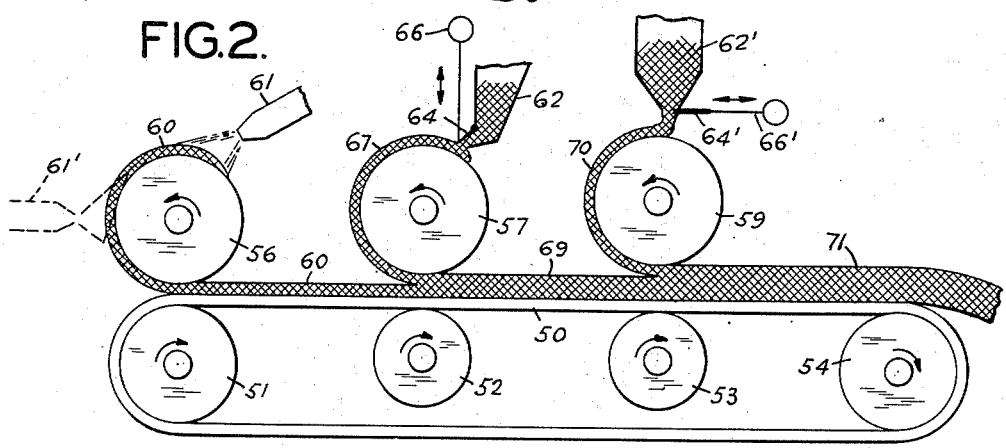

These and other advantages, as well as the utility and the objects, of the present invention will become apparent from the following detailed description made with reference to the accompanying drawing wherein:

Figure 1 is a schematic illustration of one embodiment of the present invention; and Figure 2 is a schematic illustration of another embodiment of the invention.

The embodiment illustrated in Figure 1 comprises a series of rollers 10, 11, 12 and 13 rotating in clockwise direction and a series of opposite rollers 14, 15, 16 and 17 rotating in counterclockwise direction, the bottom portion of each roller being immersed in a pan 19 containing molten wax 20 supplied from a source of molten wax 21 by way of supply line 22 or 22'. The depth of immersion of the rollers beneath the surface of molten wax 20 in pans 19 is so adjusted as to deposit a relatively thin layer of wax on the surface of the rollers. While there is no practical limit to the thickness of the layer that may be so deposited, because it is obvious that a thick layer may be cooled adequately if the cooling temperature is low enough and the speed of rotation of the drums is slow enough, it has been found preferably to form layers on the rollers that are from about 1/64 to about 1/8 of an inch thick because within this range of thicknesses the wax can be formed into sheets at optimum speeds.

Rollers 10 and 14 are spaced from one another at a distance that is approximately equal to twice the thickness of each individual layer so that when layers 24 and 26, formed on rollers 10 and 14, respectively, arrive at point 27, rollers 10 and 14 will operate to insure contact between them. Inasmuch as the outside faces of layers 24 and 26 are cooled somewhat less than the faces in contact with the surfaces of the cooling rollers, they are softer and, therefore, readily coalesce with one another to form a unitary sheet 29 of wax in the semi-solid to solid state. If desired, a pair of oppositely disposed pressure rollers 30 and 31, shown by dotted lines, may be provided to further insure adhesion of the two layers 24 and 26 into a single unitary sheet 29.

The next pair of oppositely disposed rollers 11 and 15 are similarly immersed in the molten wax in pans 19 but are spaced from one another at a distance approximately equal to four times the thickness of each individual layer of wax 32 and 34 applied to rollers 11 and 15, respectively. The sheet 29 of wax from rollers 10 and 14 passes between rollers 11 and 15 and has applied to it at both sides the additional layers 32 and 34. The operation is substantially the same here as in the previous step. In a similar manner, layers 36 and 37 are formed on rollers 12 and 16 and layers 39 and 40 are formed on rollers 13 and 17, respectively, the rollers 12 and 16 being spaced apart a distance equal to about six times the thickness of each individual layer of wax and rollers 13 and 17 being spaced apart a distance equal to about eight times the thickness of each individual layer of wax applied to any one of the rollers. The result is that a sheet 41 of wax, having a total thickness approximately eight times that of the individual layers of wax formed on each of the rollers, is continuously produced. This may be advanced to an automatic cutting and packaging machine. The outer face of the layers 32, 34, 36, 37, 39, and 40 is less cool than the face next to the wall and is, therefore, sufficiently soft and adhesive to stick to the outer face of the moving sheet or slab of wax.

It is to be understood, of course, that the method and apparatus illustrated in Figure 1 is not limited to the use of eight cooling rollers nor to the use of pans for applying a layer of wax to the individual cooling rollers. The number of cooling rollers depends entirely upon the thickness of the wax sheet that is finally desired, as well as upon the thickness of the individual layers applied to the individual cooling rollers and their speed of rotation. The individual layers of wax may be applied to the individual cooling rollers by spraying, or simply by pouring, the molten wax onto their surfaces as will be described more specifically with reference to Figure 2.

The apparatus described in Figure 2 includes a conveyor belt 50, a number of supporting rollers 51, 52, 53 and 54 for said conveyor belt and a number of cooled applicator rollers 56, 57 and 59. A layer 60 of wax is sprayed onto cooling roller 56 by means of any suitable spraying device shown schematically at 61. The sprayed layer may be applied at any desired point or area on the surface of cooling roller 56, as shown for example, by the spraying device shown by dotted lines at 61'. The cooling roller 56, as well as cooling rollers 57 and 59 may be cooled by any suitable means, such as water, a refrigerant, or the like. Cooling roller 56 is rotated at a speed and maintained at a temperature so correlated that the layer 60 of wax applied to cooling roller 56 will be in a semi-solid to solid state when it comes into contact with conveyor belt 50. Being slightly softer at the face that comes into contact with conveyor belt 50 than at the face that is in direct contact with the periphery of cooling roller 56, the layer 60 will leave cooling roller 56 and be advanced along conveyor belt 50 to beneath the next cooling roller 57. A container or line 62 having a variable opening 64 at the bottom that may be controlled by any suitable means, such as a rod 66, is positioned over and adjacent cooling roller 57 so that molten wax contained within the container or line 62 may be poured onto cooling roller 57 at a rate that will form a layer of molten wax on the surface of the cooling roller having a thickness of about $1/64$ to $1/8$ of an inch. Cooling roller 57 is rotated at a speed sufficient to make the peripheral speed of the outside face of wax layer 67 equal to the speed of advancement of layer 60 on conveyor belt 50. Supporting roller 52 for conveyor belt 50 is preferably positioned beneath cooling roller 57 so that conveyor belt 50 will not yield to any pressure that may be applied by the wax 67 on cooling roller 57. The temperature of cooling roller 57 is maintained at a level below the setting temperature of the wax so that it will be changed to the semi-solid to solid state by the time it is brought into contact with layer 60 to form a unitary sheet of wax 69.

The third cooling roller 59 is spaced from conveyor belt 50 by a distance equal to the sum of the thicknesses of the individual layers of wax applied to cooling rollers 56, 57 and 59. Wax is applied to the surface of cooling roller 59 from a container or line 62' having a gate 64' that may be adjusted by means of a hand-rod 66', or the like, so as to deposit a layer 70 of wax on the surface of cooling roller 59 that is likewise from approximately $1/64$ to $1/8$ of an inch thick. Cooling roller 59 is rotated at the same speed as cooling roller 57. Supporting roller 53 for conveyor belt 50 is preferably mounted beneath cooling roller 59 to support conveyor belt 50 at the point where layer 70 of wax is applied to and joined with layer 69 to form a unitary sheet 71 of wax in a semi-solid to solid state. The supporting rollers 51 to 54 may be cooled, if desired, and the belt 50 may be of heat conducting material, such as of stainless steel.

It is to be understood, of course, that normally all the cooling rollers in the apparatus illustrated schematically in Figure 2 would have a layer of wax applied by the same or similar means and that the different means for applying wax illustrated in Figure 2 are shown for illustrative purposes only. It is also to be understood that the conveyor belt 50 can extend beyond the first of the cooled applicator rollers, that is, roller 56, and have deposited upon it a thin layer of wax that will be joined to the layer of wax from the first cooled applicator roller. It is also to be understood that it is within the contemplation of this invention to provide pressure rollers between any two or all of the cooled applicator rollers to insure contact between the individual layers or to so adjust the spacing of the cooling applicator rollers from the conveyor belt that said rollers will exert sufficient pressure on the wax layers to insure a good bond. Furthermore, there is no limit to the number of cooled applicator rollers that may be used in series except the ultimately desired thickness of the finished and unitary sheet of wax. It is also within the contemplation of this invention to use only a single cooling roller and to fold the layer formed thereby upon itself. The folds thus formed can readily be bonded together under slight pressure to form a unitary sheet of the desired thickness.

The final width of the unitary sheet of wax may be increased somewhat, at the expense of its final thickness, beyond the width of the individual layers by using pressure rollers exerting sufficient pressure not only to insure complete binding between the individual layers but to spread out the sheet while it is still in the semi-solid state.

Illustrative of this process, a refined paraffin wax melting at 128° F. was formed into a layer by immersing a roller into a pan of molten wax maintained at 135° F. to a depth of $1/8$ to $1/4$ of an inch. The surface of the roller was maintained at a temperature of about 65° F. by circulating tap water therethrough and the roller was rotated at a speed sufficient to form a layer having a thickness of $\frac{1}{32}$ of an inch.

It was found that the wax layer thus formed separated readily from the roller, had sufficient mechanical strength to permit strips up to two feet in length to be pulled off continuously, and readily became bonded to similar layers under slight pressure.

It is believed to be unnecessary, inasmuch as data relating to the plastic range, melting and setting temperatures, and thermal conductivity of all commercial waxes are readily available to those skilled in the art, to set forth further specific examples of operation describing the precise conditions under which different waxes may be molded in accordance with the teachings of the present disclosure.

These are but a few of the many alterations and modifications that will readily occur to those skilled in the art upon reading this description and are intended to be included within the scope of this invention as defined in the following claims.

I claim:

1. A continuous wax molding process comprising forming a layer of paraffin wax in a molten state upon a moving surface, forming a second layer of said wax in a molten state upon a second moving surface, cooling said layers while on said surfaces to change said wax from a molten to a semi-solid to solid state, and joining said first and second layers while at least one of said layers is on the surface on which it is formed to form a unitary sheet of wax.

2. A continuous wax molding process comprising forming a layer of molten paraffin wax upon a rotating cylindrical surface, forming a second layer of said molten wax upon a second rotating cylindrical surface spaced a given distance from said first cylindrical surface, said layers each having a thickness of approximately one-half of said given distance between said cylindrical surfaces, individually cooling said layers to change the wax to a semi-solid to solid state, and joining said layers while they are disposed in the space between said cylindrical surfaces into a single unitary sheet of wax having a total thickness approximately equal to said given distance by rotating said cylindrical surfaces in opposite directions, the speed of rotation and surface temperature of said cylindrical surfaces being correlated to cool the separate layers to a semi-solid to solid state by the time they are joined together.

3. A continuous wax molding process comprising forming a layer of molten paraffin wax having a thickness of from about 1/64 to about 1/8 of an inch upon the peripheral surface of a rotating cylinder, forming a second layer of molten wax of equal thickness upon the peripheral surface of a second rotating cylinder, said second cylinder being spaced from said first cylinder by a distance approximately equal to the combined thickness of said layers, and joining said layers while they are disposed in the space between said cylindrical surfaces into a single unitary sheet of wax having a total thickness approximately equal to said distance between said cylinders by rotating said cylinders in opposite directions, the speed of rotation and surface temperature of said cylinders being correlated to cool the separate layers to a semi-solid to solid state by the time they are joined together.

4. A continuous wax molding process comprising forming a continuously advancing layer of molten wax upon a rotating cylindrical surface, cooling said layer of paraffin wax while on said surface to change said wax to a semi-solid to solid state, removing said continuously advancing layer of wax from said cylindrical surface, forming a second continuosly advancing layer of molten wax upon a second rotating cylindrical surface, cooling said second layer of wax while on a said second cylindrical surface to change said layer of wax to a semi-solid to solid state, removing said continuously advancing second layer of wax from said second cylindrical surface, and joining said first and second advancing layers to form a unitary sheet of wax in a semi-solid to solid state while at least one of said layers is disposed on the surface on which it is formed.

5. A continuous wax molding process comprising forming a layer of petroleum wax in a molten state upon a moving surface, forming a second layer of said wax in a molten state upon a second moving surface, cooling said layers while on said surfaces to change said wax from molten to a semi-solid to solid state, and joining said first and second layers while on said surfaces to form a unitary sheet of wax.

RALPH G. ATKINSON.

REFERENCES CITED

The following references are of record in the file of this patent:

UNITED STATES PATENTS

| Number | Name | Date |
|---|---|---|
| 521,371 | Hewitt | June 12, 1894 |
| 1,467,867 | Mauch | Sept. 11, 1923 |
| 2,007,578 | Madge | July 9, 1935 |
| 2,341,732 | Marvin | Feb. 15, 1944 |

Certificate of Correction

Patent No. 2,532,280 December 5, 1950

RALPH G. ATKINSON

It is hereby certified that error appears in the printed specification of the above numbered patent requiring correction as follows:

Column 4, line 17, for the word "preferably" read *preferable*; column 8, line 3, strike out "paraffin" and insert the same after "molten" in line 2, same column;

and that the said Letters Patent should be read as corrected above, so that the same may conform to the record of the case in the Patent Office.

Signed and sealed this 6th day of February, A. D. 1951.

[SEAL]

THOMAS F. MURPHY,
*Assistant Commissioner of Patents.*